(12) United States Patent
Quinlan

(10) Patent No.: US 7,654,181 B2
(45) Date of Patent: Feb. 2, 2010

(54) DUST COLLECTION SHROUD

(76) Inventor: Edward Quinlan, 74 Pioneer Dr., West Hartford, CT (US) 06117

( * ) Notice: Subject to any disclaimer, the term of this patent is extended or adjusted under 35 U.S.C. 154(b) by 254 days.

(21) Appl. No.: 11/209,302

(22) Filed: Aug. 23, 2005

(65) Prior Publication Data

US 2006/0042440 A1 Mar. 2, 2006

(51) Int. Cl.
| | |
|---|---|
| B26D 7/06 | (2006.01) |
| B26D 1/18 | (2006.01) |
| B27B 3/28 | (2006.01) |
| B27B 27/04 | (2006.01) |
| B27C 1/00 | (2006.01) |
| B27G 19/00 | (2006.01) |
| B27G 21/00 | (2006.01) |

(52) U.S. Cl. ................ 83/100; 83/477.2; 83/152; 144/252.1; 144/114.1

(58) Field of Classification Search .............. 83/477.2, 83/152, 100; 144/252.1, 114.1
See application file for complete search history.

(56) References Cited

U.S. PATENT DOCUMENTS

| | | | |
|---|---|---|---|
| 922,840 A | 5/1909 | Bemiller | |
| 1,939,925 A | 12/1933 | Schwartz | 164/65 |
| 2,044,481 A | 6/1936 | Manley et al | 144/252 |
| 3,763,748 A | 10/1973 | Gallagher, Jr. | 93/36 M |
| 3,905,263 A * | 9/1975 | Smith | 83/477.2 |
| 4,063,478 A * | 12/1977 | Stuy | 83/100 |
| 4,088,164 A | 5/1978 | McCord, Jr. | 144/252 R |
| 4,253,362 A * | 3/1981 | Olson | 83/100 |
| 4,255,995 A * | 3/1981 | Connor | 83/100 |
| 4,721,023 A * | 1/1988 | Bartlett et al. | 83/100 |
| 4,895,483 A | 1/1990 | Anderson | 409/132 |
| 4,896,572 A | 1/1990 | Smyth et al. | 83/100 |
| 5,435,217 A * | 7/1995 | Kato et al. | 83/100 |
| 5,882,155 A | 3/1999 | Testa, Jr. | 409/132 |
| 6,131,629 A * | 10/2000 | Puzio et al. | 144/252.1 |
| 6,183,527 B1 | 2/2001 | O'Banion et al. | 55/385.1 |
| 6,283,002 B1 * | 9/2001 | Chiang | 83/477.1 |
| 6,370,997 B1 * | 4/2002 | Rugen et al. | 83/100 |
| 6,481,473 B2 * | 11/2002 | Liao et al. | 144/252.1 |
| 6,530,303 B1 * | 3/2003 | Parks et al. | 83/473 |
| 6,925,919 B2 * | 8/2005 | Liao et al. | 83/168 |
| 6,994,008 B2 * | 2/2006 | Liao et al. | 83/473 |
| 2003/0196725 A1 | 10/2003 | Chuang | 144/252.1 |
| 2006/0272464 A1 * | 12/2006 | Chen | 83/100 |

* cited by examiner

*Primary Examiner*—Ghassem Alie
*Assistant Examiner*—Bharat C Patel
(74) *Attorney, Agent, or Firm*—Alix, Yale & Ristas, LLP

(57) ABSTRACT

A dust collector has a shroud mounted to the connecting rods of the pivoting assembly of a contractor's table saw. The shroud is configured to surround the lower portion of the saw blade when the blade is fully raised, and most of the blade's diameter when it is fully lowered. The shroud is equipped with a nozzle for connection of a dust collection hose. The shroud extends upwardly between the connecting rods of the pivoting assembly and between the front and rear trunnions. The longitudinal outside surfaces of the shroud are provided with shoulders that abut the connecting rods. Retainers engage the connecting rods to support the shroud against the shoulders. Thus, the dust collector is suspended below and removably connected to the pivoting assembly of the table saw. One corner of the shroud includes an opening to accommodate the arbor bracket and its vertical movement.

9 Claims, 12 Drawing Sheets

Dust collection tray with hose port

To dust collector

DUST COLLECTION SHROUD

BACKGROUND OF THE INVENTION

1. Field of the Invention

The present invention relates generally to dust collection in woodworking equipment and more particularly to dust collection from a contractor's table saw.

2. Description of the Relevant Art

Contractor's table saws typically support the table on a three-sided sheet metal cabinet. The cabinet is usually open at the back and bottom and bolts to a stand at its lower edge. The electric drive motor is mounted to the back of the saw with a motor bracket and covered drive belt extending through the open rear of the cabinet. The motor is suspended in such a way that the weight of the motor maintains tension on the drive belt.

In a table saw, the circular saw blade is mounted to an arbor that is supported for rotation by an arbor bracket. The arbor bracket pivots, permitting the arbor and blade to be raised and lowered relative to the table of the saw. The arbor is also able to pivot on an axis to provide angled cuts. In a typical contractor's table saw, the arbor bracket is mounted to the front trunnion. A pair of connecting rods couples the front trunnion to a rear trunnion such that the front and rear trunnions, along with the supported arbor bracket and blade pivot as one. Further, the motor assembly is mounted to the rear trunnion and pivots with the front trunnion, rear trunnion, connecting rods, arbor and blade. Pivoting the motor with the other moving components of the table saw maintains a simple relationship between the drive motor pulley and the driven pulley on the arbor. The suspended arrangement of the drive motor maintains a substantially constant tension on the drive belt regardless of the elevation of the arbor and blade.

The open rear and bottom of the cabinet in a contractor's table saw allows sawdust to scatter widely. Some contractor's table saws are provided with a dust collection tray. The typical dust collection tray covers the open bottom of the cabinet. The tray is provided with a nozzle for connection to the hose of a dust collector. A major drawback of this arrangement is that the rear of the cabinet remains open, resulting in poor dust containment. Dust spews through the back of the saw. Assuming a collection tray is mounted, the open back also substantially reduces the suction efficiency of dust collection equipment. Closing the rear of the cabinet is problematic since the drive motor bracket and belt drive protrude out the open rear of the cabinet and are required to move relative to the cabinet during blade pivoting.

There is a need in the art for a cost-efficient and effective dust collection device for a contractor's table saw.

SUMMARY OF THE INVENTION

Briefly stated, aspects of the present invention relate to a dust collection shroud mounted to the connecting rods of the pivoting assembly of a contractor's table saw. The shroud is configured to surround the lower portion of the saw blade when the blade is fully raised, and most of the blade's diameter when it is fully lowered. The shroud is equipped with a nozzle for connection to dust collection equipment. The shroud extends upwardly between the connecting rods of the pivoting assembly and between the front and rear trunnions. The longitudinal outside surfaces of the shroud are provided with laterally projecting shoulders that abut the connecting rods. Retainers engage the connecting rods to support the shroud against the shoulders. Thus, the dust collector is suspended below and removably connected to the pivoting assembly of the table saw. One corner of the shroud includes an opening to accommodate the arbor bracket and its vertical movement.

The open portion of the shroud also accommodates the saw blade, which extends toward the front of the saw parallel to the arbor bracket. The arbor bracket describes an arc as the blade is raised or lowered. In most table saws, the front trunnion casting includes a rounded hollow to accommodate the front portion of the blade as it is moved to its fully lowered position. An aspect of the present invention relates to a front plate configured to conform to the hollow of the front trunnion and configured to substantially close the open portion of the shroud. Preferably, the front plate is configured to fit the front trunnion snugly, penetrating into the hollow defined by the front trunnion. The front plate may a material that will be removable by the saw blade during saw use without damaging the blade. In this manner, the front plate may be configured to very closely match the shape and path of the saw blade.

The front plate may be customized to closely match the contours of the front trunnion for each brand of contractor's table saw. A customized front plate may be employed with a standardized dust collection shroud to configure the dust collection shroud for various brands of contractor's table saw.

The close-fitting configuration of the shroud combined and the front plate provides superior dust containment. The shroud moves with the pivoting assembly of the table saw. The spring-biased mounting may accommodate any shroud movement necessitated by pivoting. Ideally, the dust collection shroud is configured such that it does not interfere with movement of the pivoting portions of the contractor's saw.

DETAILED DESCRIPTION OF THE PREFERRED EMBODIMENT

Figure 1:
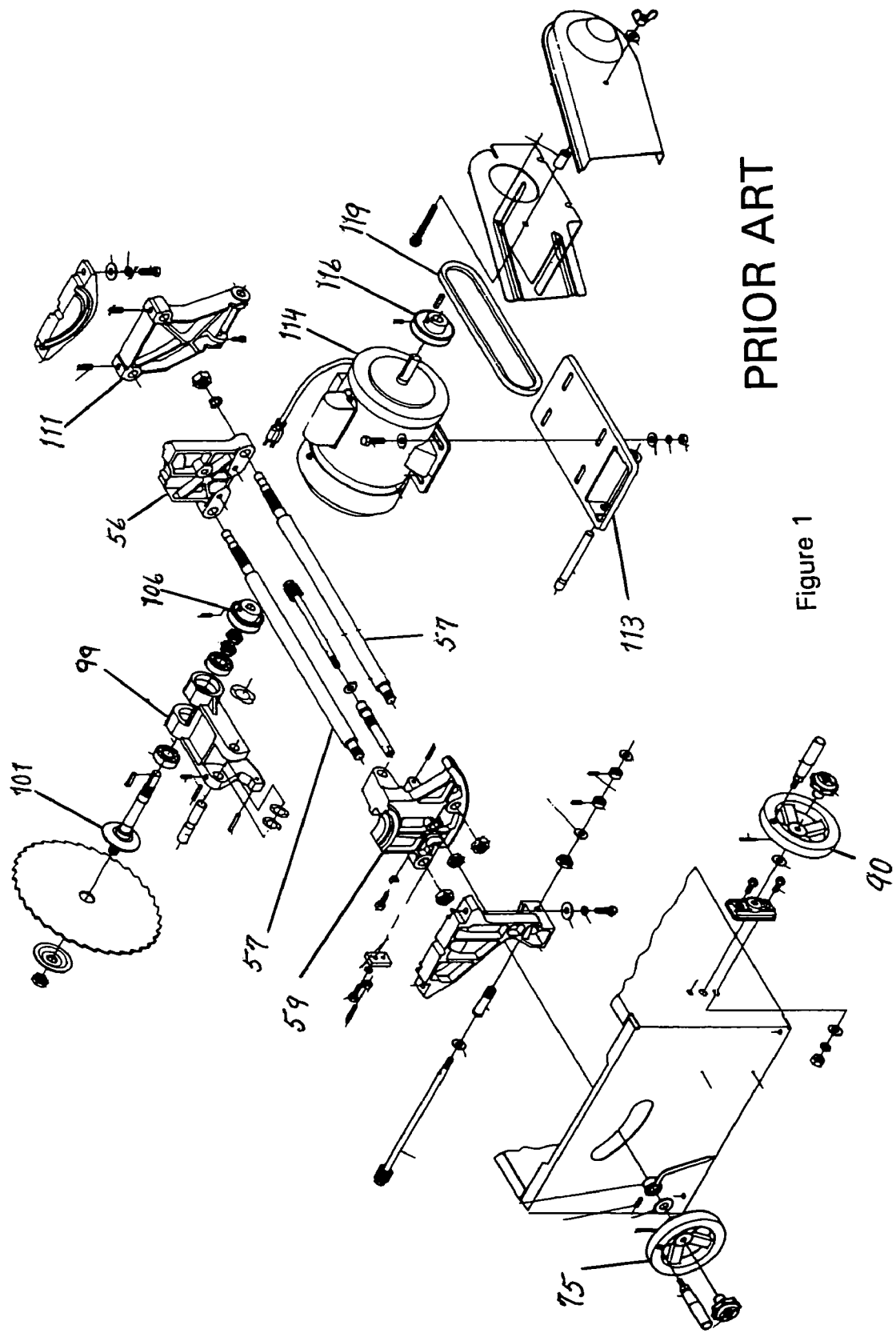
FIGS. 1 and 2 are exploded perspective views of portions of a contractor's saw compatible with a dust catcher according to the present invention.

A dust collection shroud according to aspects of the present invention will now be described in the context of a typical contractor's table saw. FIGS. 1-4 illustrate a typical contractor's table saw and prior art dust collection apparatus for such a saw. The blade of a table saw is supported by a mechanism that permits the blade to be raised and lowered and also to pivot from a vertical position to a 45° angle relative to the table of the table saw. As best seen in the exploded view of FIG. 1, the saw blade is mounted to an arbor 101, which is supported for rotation by an arbor bracket 99. The arbor bracket is pivotally mounted to a front trunnion 59. A portion of the arbor bracket passes through an opening in the front trunnion as the blade is lowered. A blade adjustment wheel 75 allows the user to pivot the arbor bracket relative to the front trunnion to raise or lower the blade relative to the table of the table saw. The front trunnion 59 is rigidly coupled to a rear trunnion 56 by connecting rods 57. The front and rear trunnions 59, 56, connecting rods 57, arbor bracket 99, arbor 101 and blade are arranged to pivot together as an assembly. These components will be referred to as the "pivoting assembly". A worm gear driven by hand wheel 90 engages an arcuate toothed lower surface of the front trunnion 59 to pivot the pivoting assembly relative to the stationary portions of the table saw.

Figure 2:
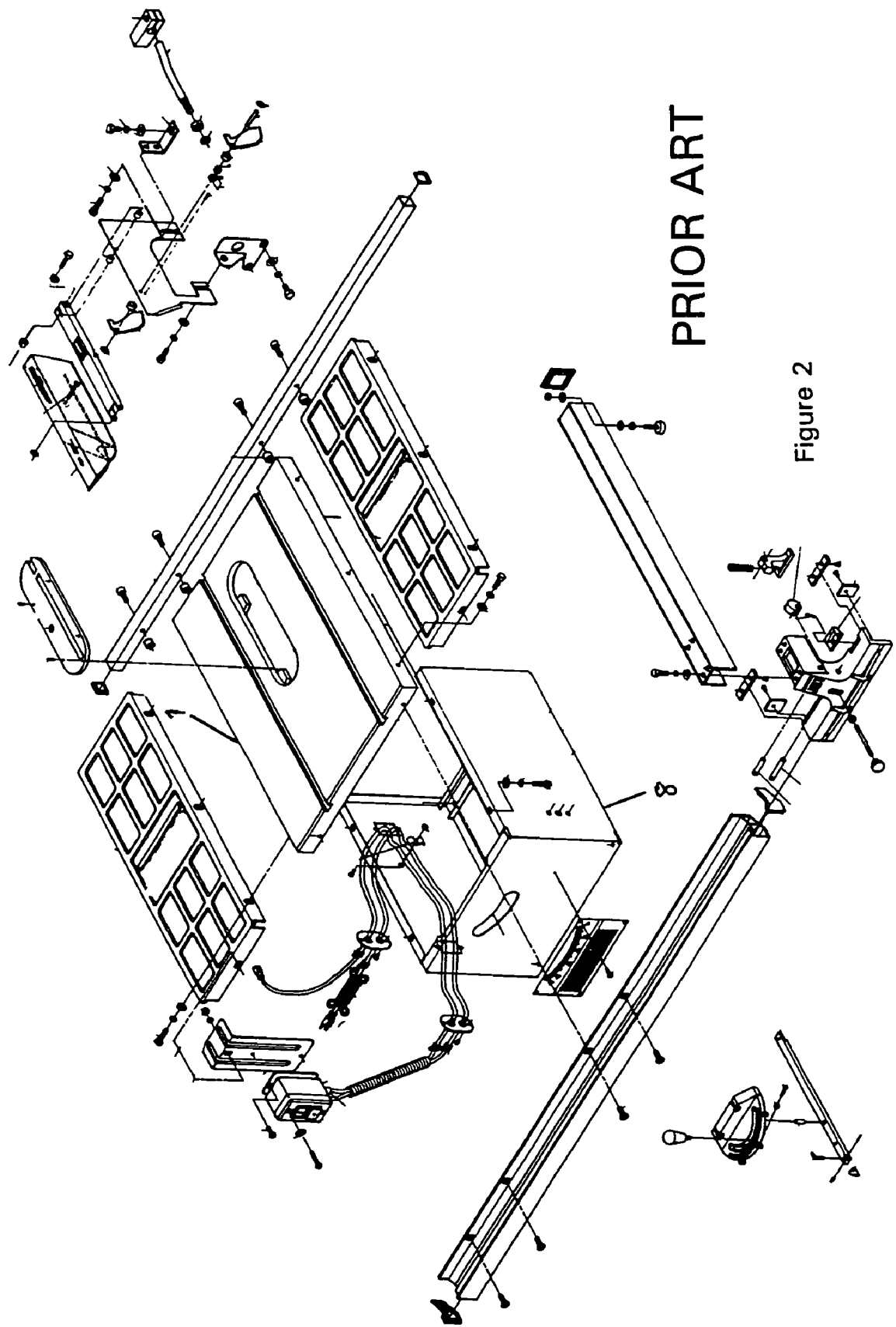

As best shown in FIG. 2, the table 1 of the table saw is supported above a stand 3 (see FIG. 7) by a three-sided cabinet 8. The bottom and rear of the cabinet are open. The open rear of the cabinet permits the motor 114, drive belt 119 and motor plate 113 to protrude from the rear of the table saw. The motor plate 113 is pivotally mounted to a motor plate bracket 111, which is rigidly fixed to the protruding ends of the connecting rods 57 adjacent the rear trunnion 56. In this manner, the motor and its support structure are arranged to pivot with the pivoting assembly. As is typical in this type of table saw, the pivoting motor plate 113 allows the weight of the drive motor 114 to maintain tension on the drive belt 119 between the motor pulley 116 and the arbor pulley 106. The motor plate 113 pivots to accommodate movement of the arbor pulley 106 when the blade is raised or lowered.

Figure 3:
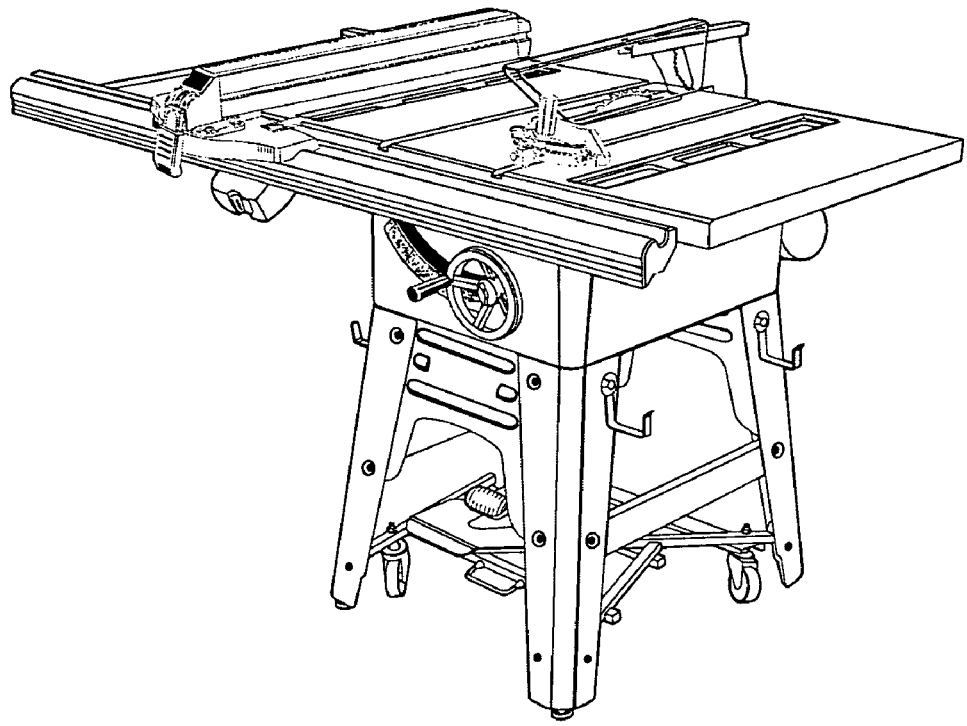
FIGS. 3 and 4 illustrate and describes a contractor's saw generally compatible with a dust catcher according to the present invention.
Figure 4:
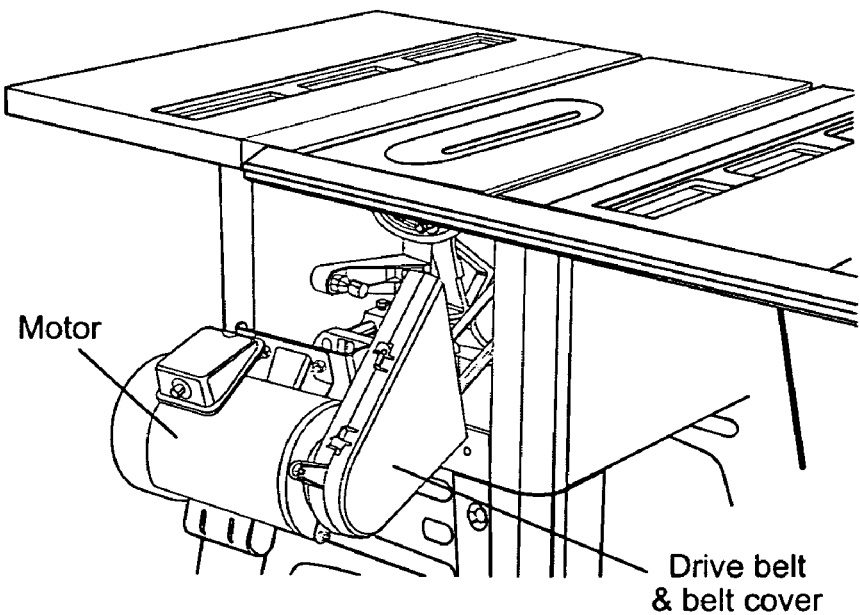
Figure 5:
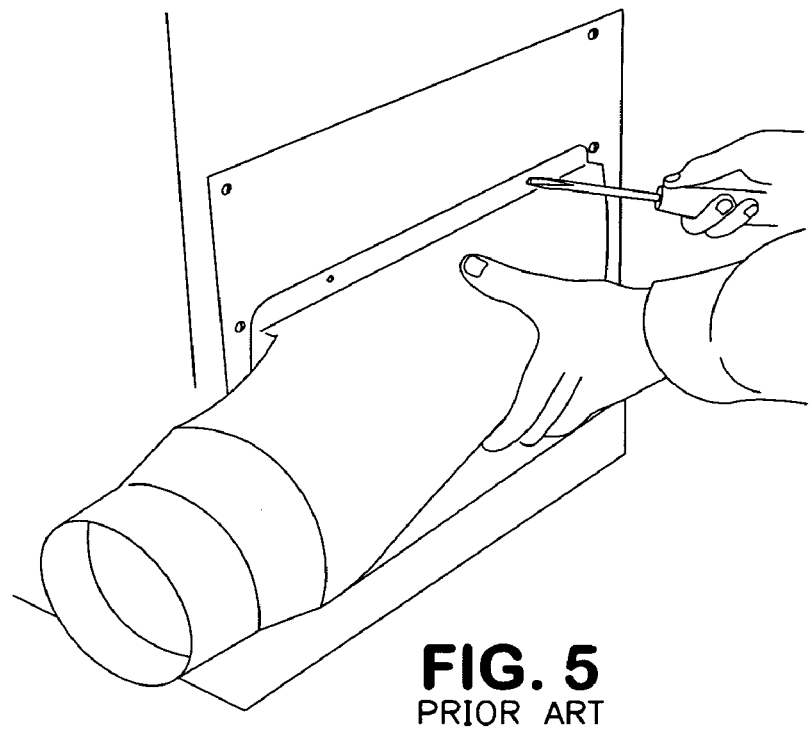
FIGS. 5-7 illustrate prior art dust collecting arrangements over which the present invention is an improvement.
Figure 6:
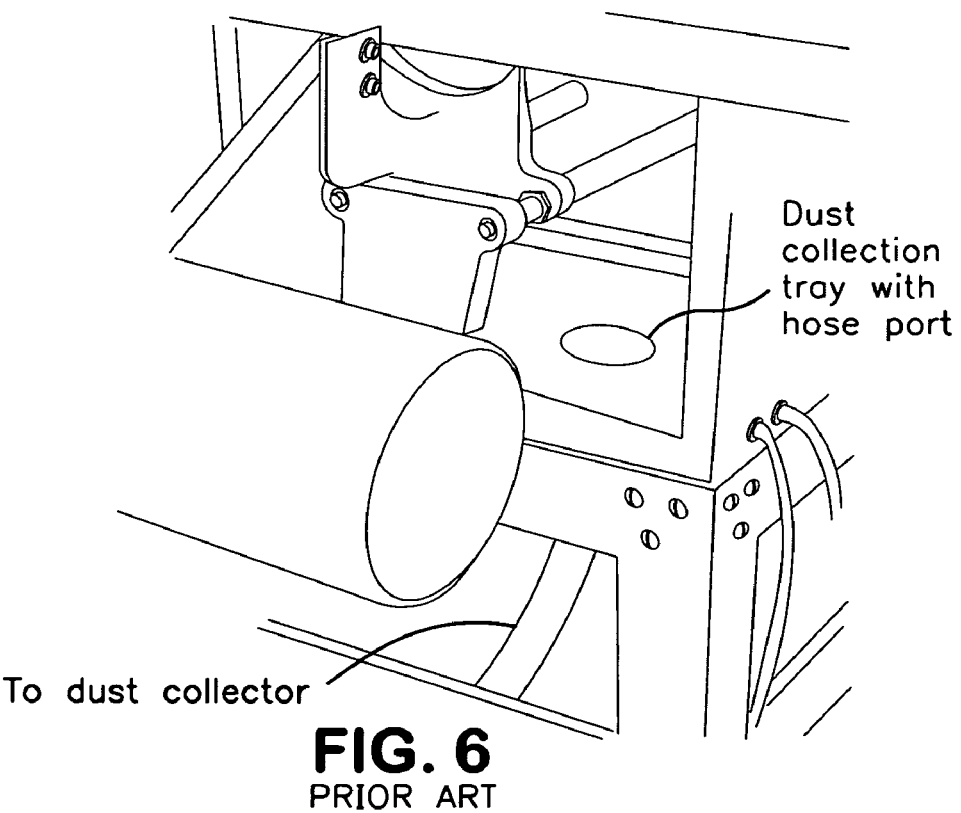
Figure 7:
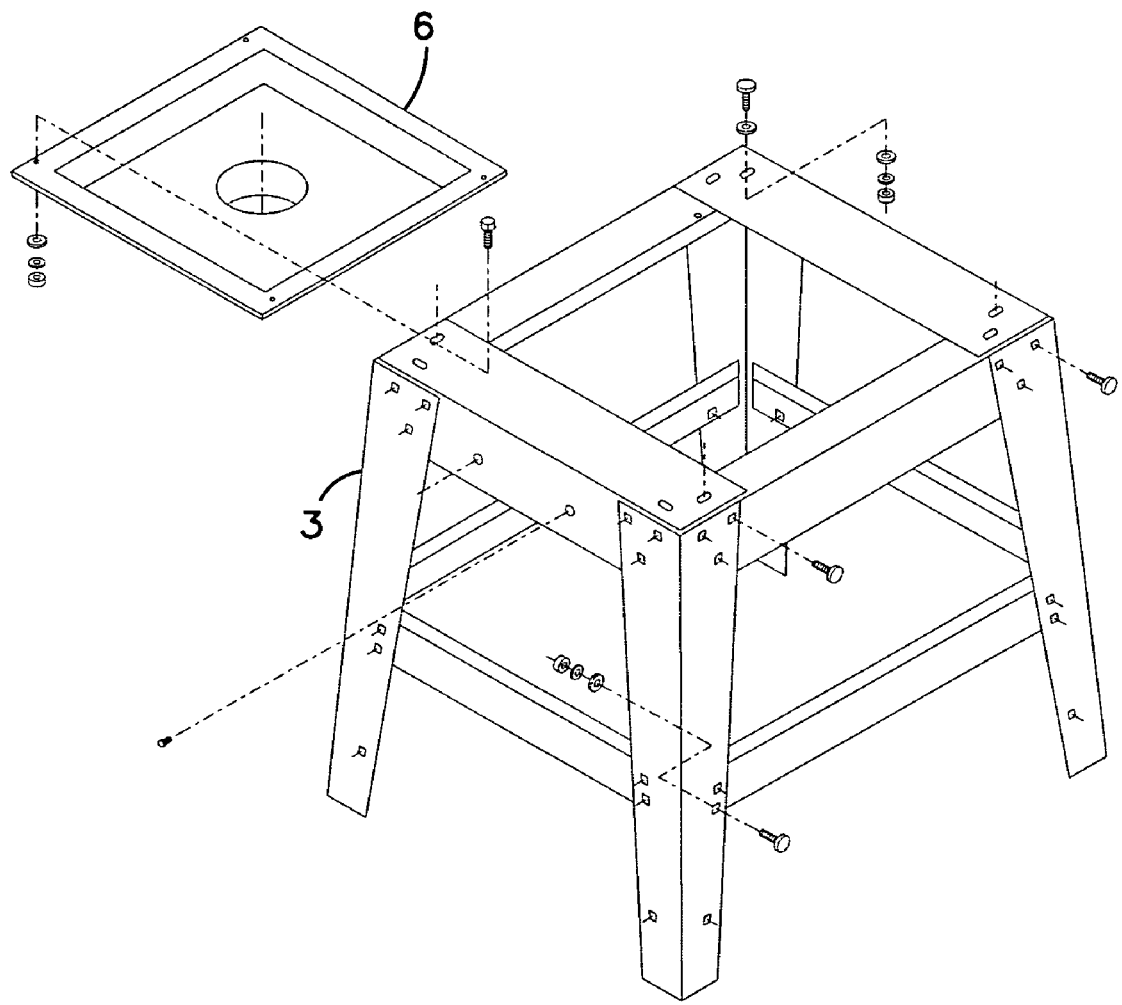

FIGS. 3 and 4 are front and rear views of a typical contractor's table saw as assembled. The rear view clearly illustrates the open rear of the cabinet and the protruding motor, drive belt and belt cover. The open bottom and rear of the cabinet present a dust collection problem by allowing sawdust generated by the table saw to escape. FIGS. 5-7 illustrate prior art dust collection apparatus for a contractor's table saw. The typical arrangement for a contractor's table saw includes a tray 6 which sits on the stand 3 and closes off the bottom of the table saw cabinet 8. The tray 6 includes a nozzle for connection to dust collection equipment. The tray 6 represents a compromise solution, since the rear of the cabinet 8 remains open. Closure of the rear of the cabinet 8 is complicated because the motor 114 and drive assembly protrude through the back of the cabinet 8 and must rotate relative to the cabinet with the pivoting assembly.

Figure 8:
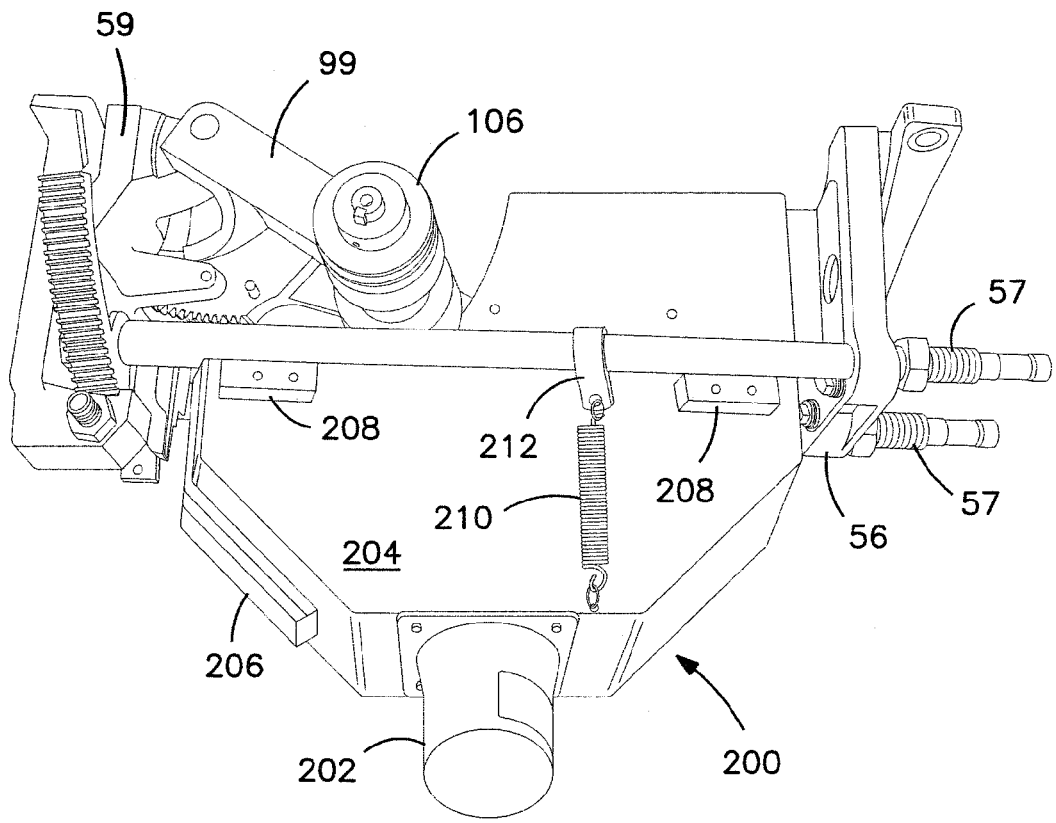
FIG. 8 is a side view from below of a dust catcher according to aspects of the present invention in functional conjunction with the pivoting parts of a contractor's table saw.
Figure 9:
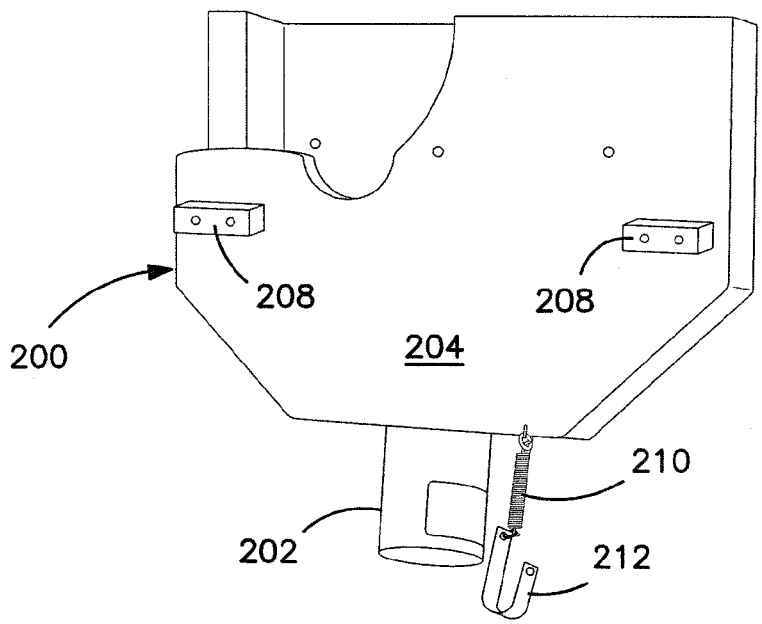
FIG. 9 is a side view in isolation of a dust catcher according to aspects of the present invention.
Figure 10:
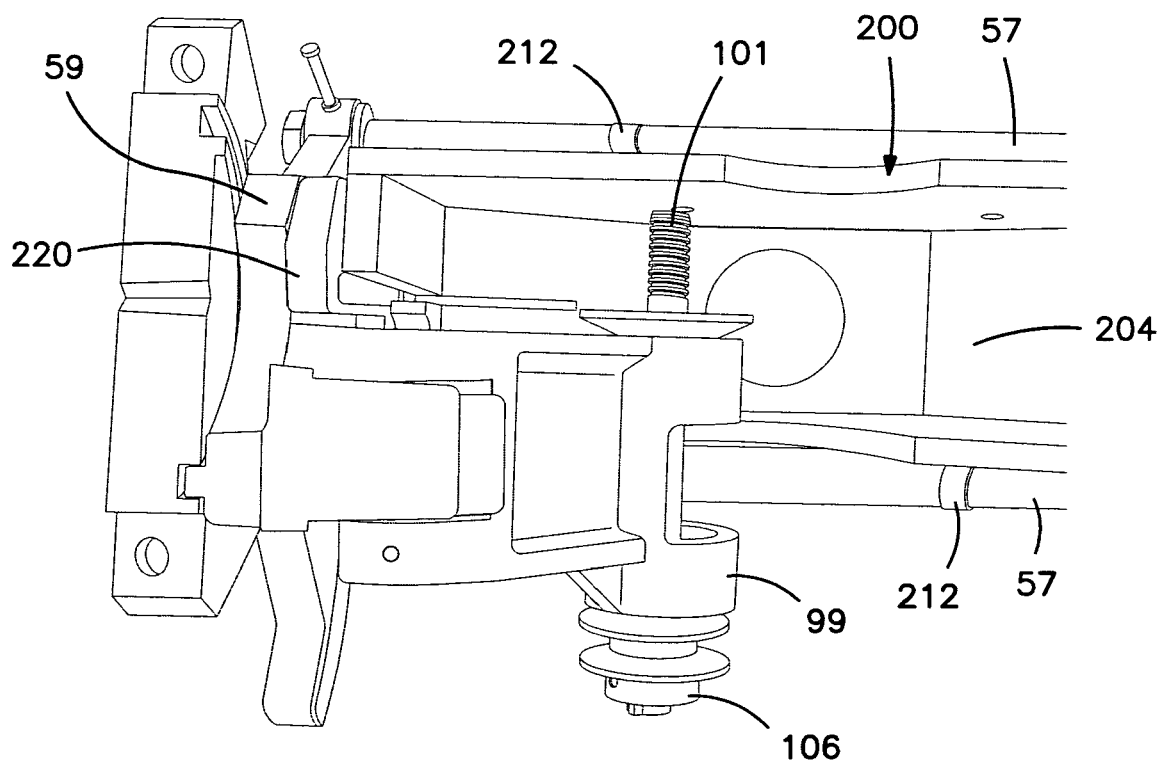
FIG. 10 is an enlarged partial top view of the dust catcher and table saw pivoting parts of FIG. 1.
Figure 11:
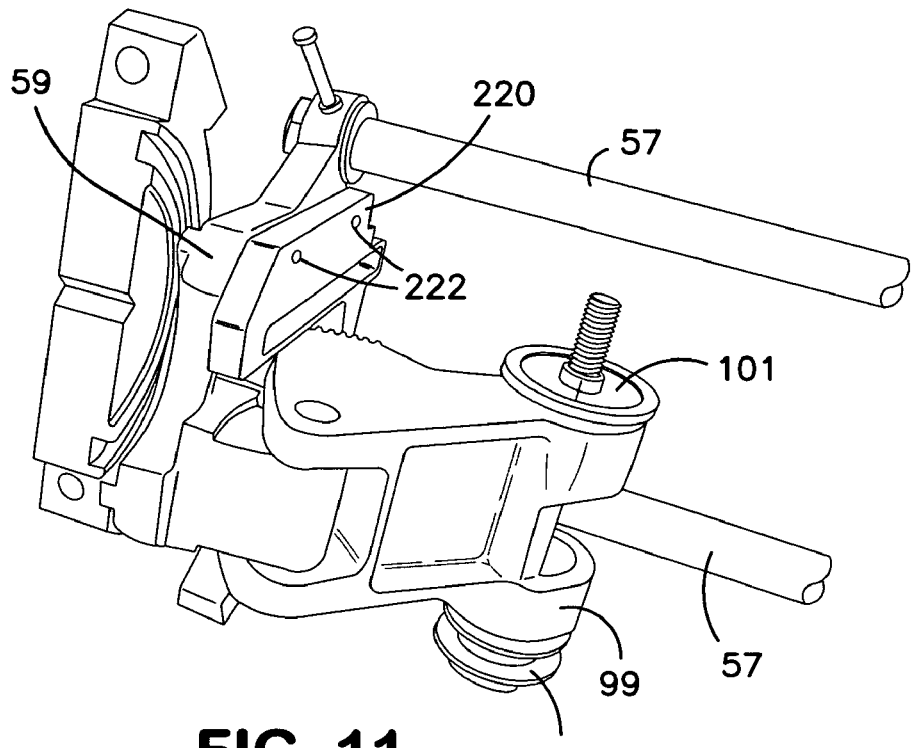
FIG. 11 is an enlarged partial top view of the pivoting parts of a contractor's table saw in functional conjunction with an front plate according to aspects of the present invention.
Figure 12:
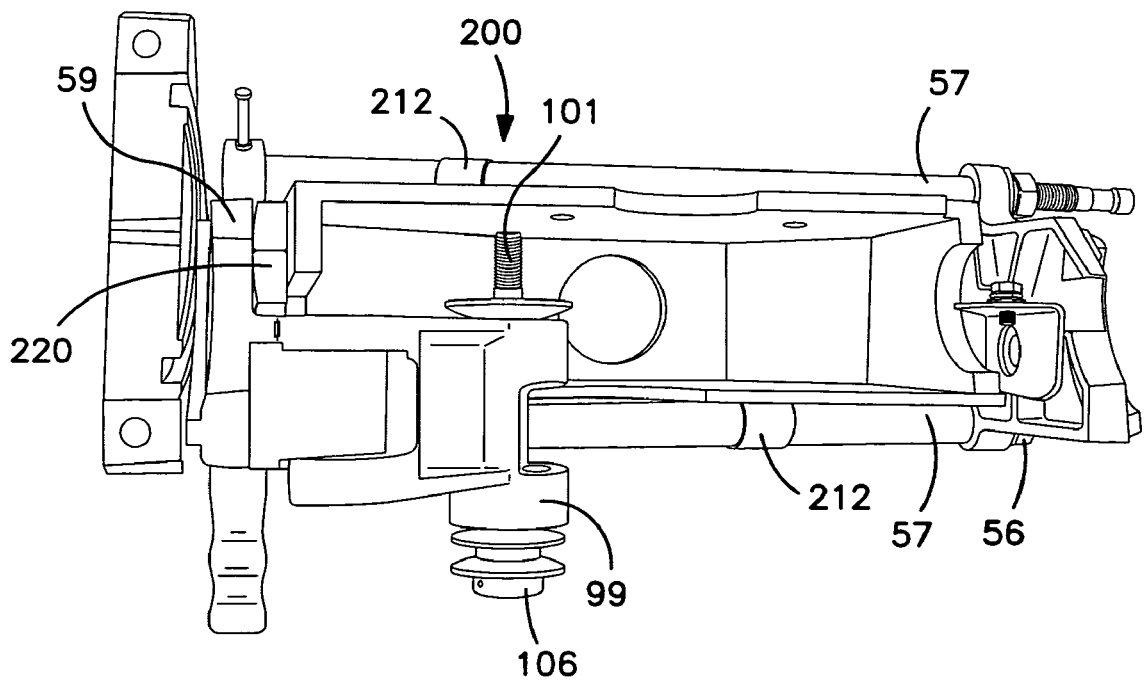
FIG. 12 is a top view of a dust catcher and table saw pivoting parts of FIG. 1.

FIGS. 8-12 illustrate a first embodiment of a dust catcher according to aspects of the present invention. The dust catcher 200 includes a shroud 204 configured to mount to and pivot with the pivoting assembly of the table saw. When viewed from the top, as best seen in FIGS. 10 and 12, the shroud 204 is generally rectangular and configured to fit a space defined between the connecting rods 57, and front and rear trunnions 59, 56 of the pivoting assembly. The lowest part of the shroud 204 is equipped with a nozzle 202 for connection of a dust collector hose. The forward portion of the shroud 204 is configured to accommodate the arbor bracket 99, arbor 101 and blade as shown in FIG. 9. The shroud 204 is configured to accommodate movement of the arbor bracket 99 during raising and lowering of the saw blade.

Another feature of the forward portion of the shroud 204 is its configuration to accommodate the saw blade. The illustrated shroud 204 is constructed from wood. The saw blade removes material when the blade comes in contact with the shroud 204. As best seen in FIGS. 10 and 12, material removal by the saw blade necessitates extension of the shroud forwardly and downwardly to maintain the integrity of the enclosure while accommodating the saw blade. FIG. 8 shows a cover 206 over a slot created by the saw blade in the forward lower portion of the shroud. The cover 206 is shown as an attached piece for prototype purposes only and will be molded as one piece with the shroud.

FIGS. 10-12 illustrate a front plate 220 positioned to cover a forward opening which accommodates the saw blade. As best seen in FIG. 10, wood material from the front plate 220 is removed by contact with the saw blade. As shown in FIG. 11, the front plate is a piece of wood configured to cover the open forward end of the shroud. It is secured to the front trunnion by magnets 222 although other means of fixture are possible. In the illustrated embodiment, the front plate 220 is a separate component. Alternatively, it is envisioned that the more complex shape of the shroud in the region of the saw blade (where it penetrates through the front wall of the shroud) could be accommodated by a molded plastic part integral with the rest of the shroud. A preferred embodiment of the invention employs a shroud configured to fit several brands of table saw in conjunction with front plates configured to closely match the shape of the front trunnion for each particular brand of table saw. The edge of the front plate 220 adjacent the arbor bracket 99 may be provided with a brush or flexible seal to further seal the assembly against dust escape. As a further refinement to the disclosed dust collection shroud, the customized front plate and standardized shroud would be coupled together and secured to the front trunnion 59 to prevent the assembly from sliding away from the front trunnion during use. Securing the shroud 204 to the front plate 220 also creates a seal between the two to further enhance dust containment.

As best shown in FIG. 12, the rear portion of the shroud 204 is also shaped to accommodate saw components during pivoting. In general, the shroud 204 is configured to substantially surround as much space as necessary beneath the table to contain the blade in its lowered position and the lower portion of the blade when the blade is in its raised position as shown in FIG. 4. The shroud 204 defines a relatively small space that is efficiently evacuated by dust collection equipment, creating an area of negative pressure to actively draw in dust generated by the saw blade. As best seen in FIG. 8, the shroud 204 extends upwardly above the connecting rods 57 to a point very close to the table of the table saw. Alternatively, a flexible material could be added to the top of the shroud walls to close the gap almost entirely, and still permit full tilting of the blade to 45°. It should be noted that most contractor's table saws pivot the blade to the right (when viewed from the front of the saw). The nozzle 202 of the illustrated dust catcher is angled toward the viewer in FIGS. 8 and 9 to accommodate movement of the pivoting assembly. On the few saws that pivot to the left, the configuration of the nozzle and other portions of the shroud configured to accommodate this movement will be adjusted accordingly.

As best seen in FIGS. 8 and 9, the sides of the shroud 204 include shoulders 208 configured to abut the connecting rods 57. Spring-biased clips 212 support the shroud by hooking over the connecting rods 57. In the illustrated embodiment, a coil spring 210 provides an upward bias on the shroud. In a molded dust catcher, the shoulders 208 could be provided integrally to the shroud. Further, a molded dust catcher could be configured with an even smaller internal area than the illustrated dust catcher 200. The internal space defined by the shroud should always have sufficient room to accommodate use of a full width dado set. The smaller internal area would generate higher negative pressure, more efficiently drawing sawdust into the nozzle 202 and dust collection equipment. It is envisioned that a molded shroud would include smoothly contoured internal surfaces to improve airflow and dust movement toward the nozzle. A molded shroud may be provided with detents corresponding to the connector bars such that the shroud snaps in place, eliminating the springs and clips. Other means of attachment are possible. Some means for adjusting the position of the detents may be necessary to allow for variation in the lateral spacing between connector bars on different brands of contractor's table saws. The nozzle may also be integrally molded with the shroud.

Figure 14:
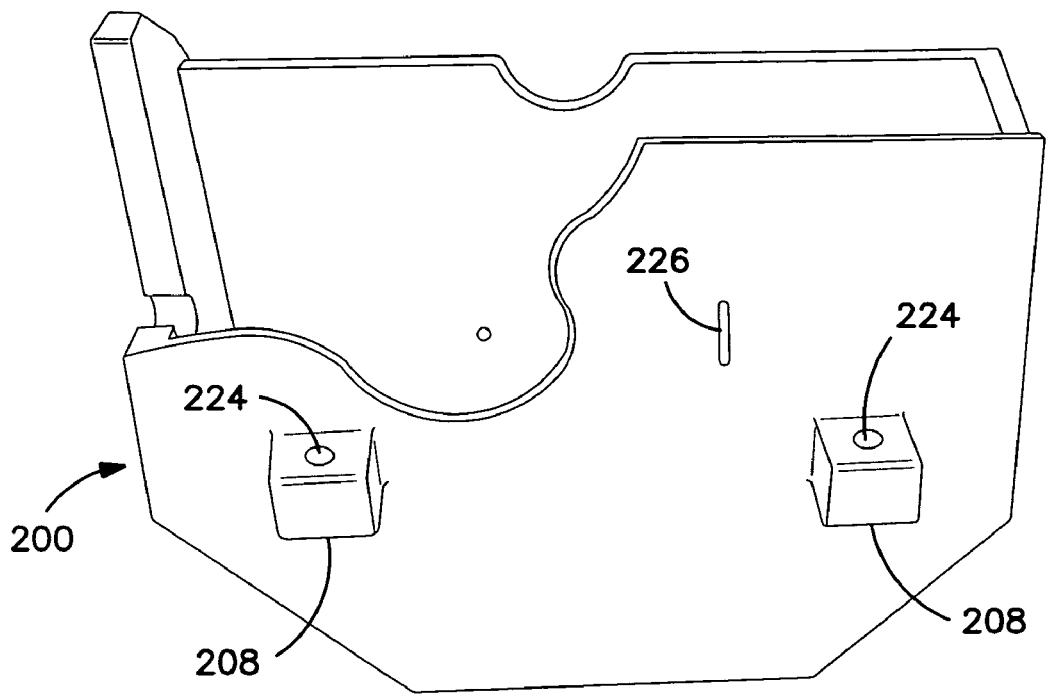
FIG. 14 is an opposite side view from above of the dust catcher of FIG. 13.
Figure 15:
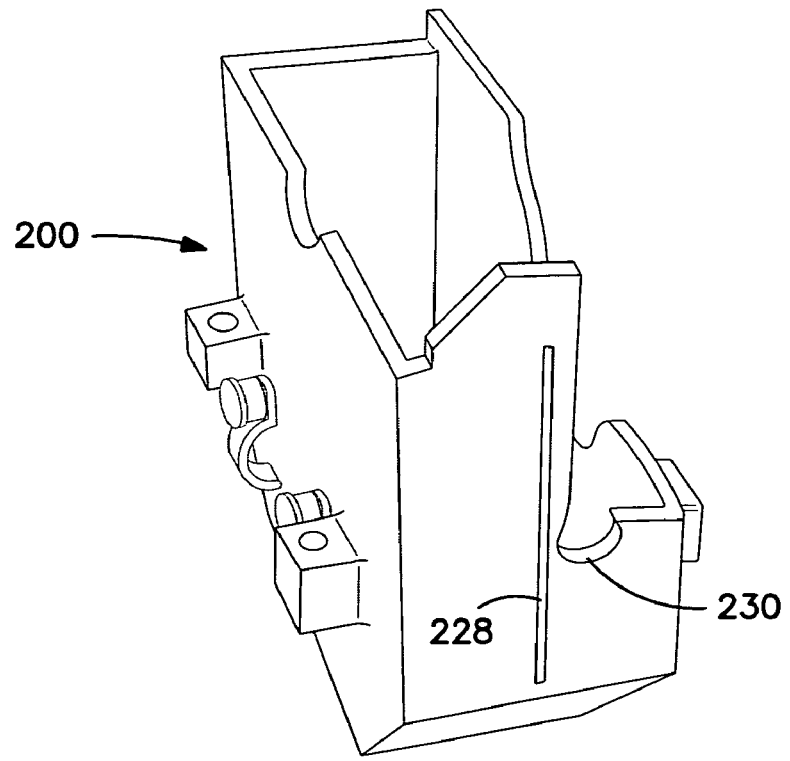
FIG. 15 is a left end view from above of a dust catcher of FIG. 14.
Figure 16:
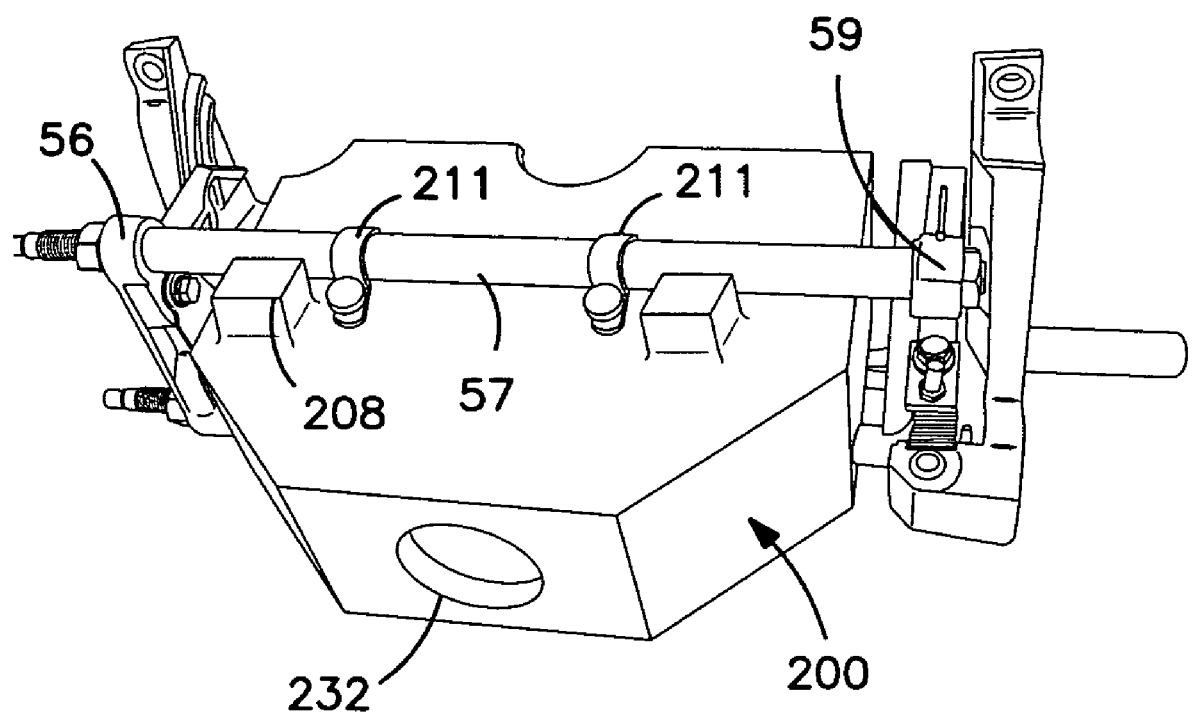
FIG. 16 is a bottom view of the dust catcher of FIGS. 13-15 in functional conjunction with the pivoting assembly of a contractor's table saw.
Figure 17:
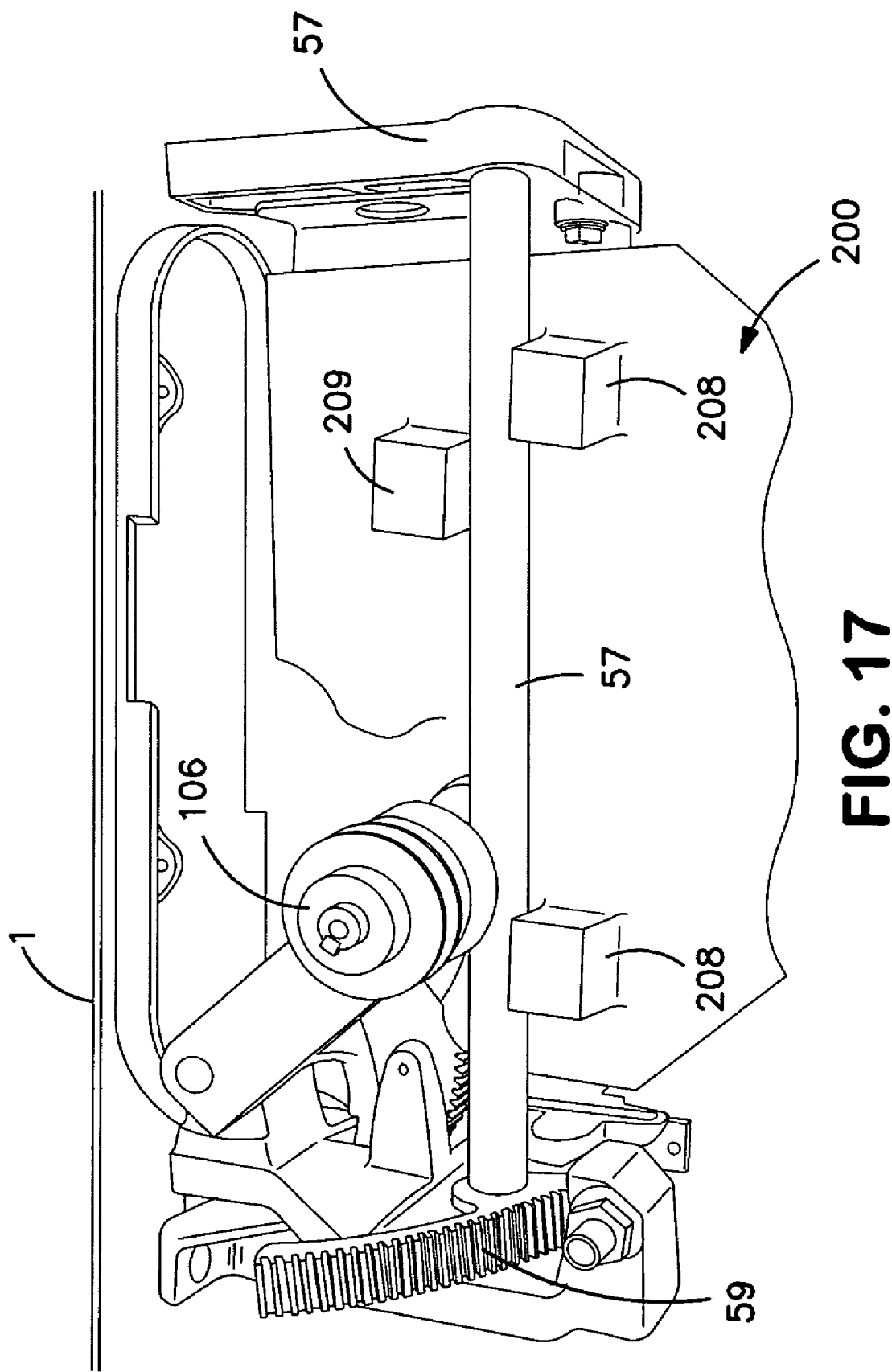
FIG. 17 is an opposite side view of the dust catcher and pivoting assembly of a contractor's table saw of FIG. 16.

FIGS. 13-17 illustrate a second embodiment of a dust catcher according to aspects of the present invention. The embodiment of FIGS. 13-17 shares many features and much of the functionality of the dust catcher embodiment illustrated in FIGS. 8-12. Similar structures and features are identified by common reference numerals throughout the Figures. The shroud 204 of the dust catcher 200 is generally rectangular in shape and configured to fit between the connecting rods 57 and the front and rear trunnions 59, 56. As shown in FIGS. 16 and 17, the sides of the shroud 204 are configured to extend upwardly above the connecting rods to a point adjacent the bottom of the saw table 1.

Figure 13:
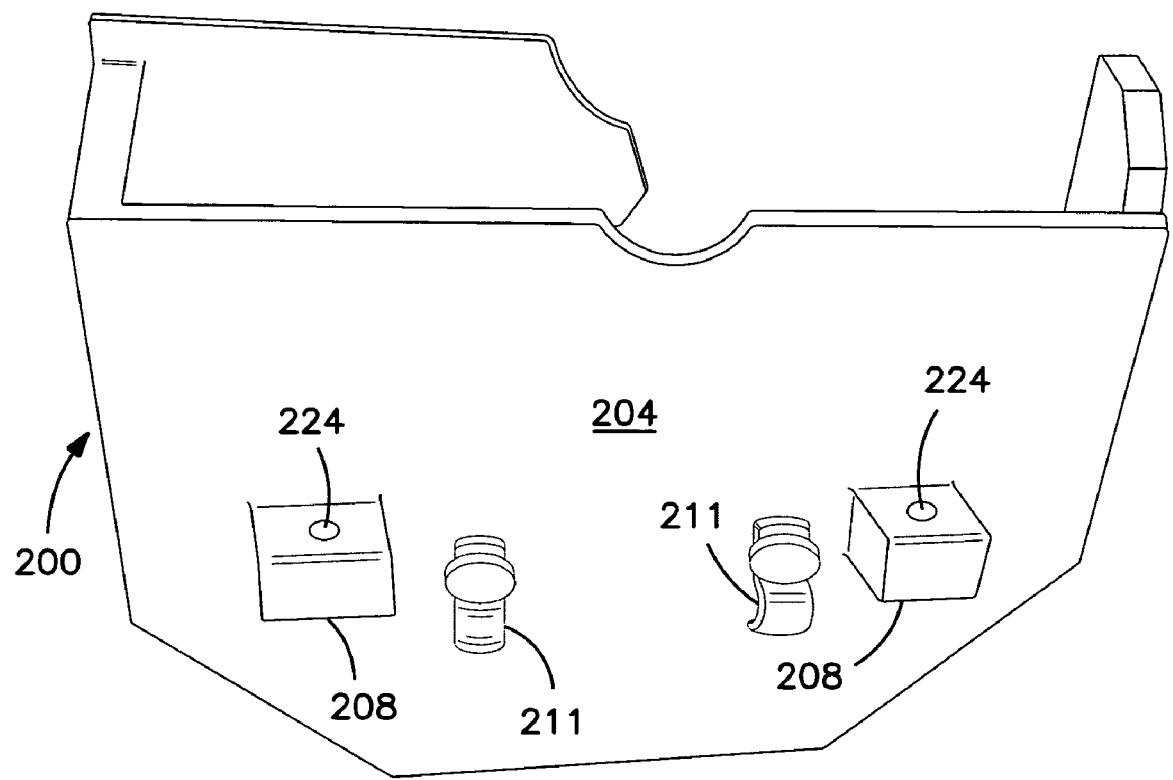
FIG. 13 is a side view from above of a second embodiment of a dust catcher according to aspects of the present invention.

In the embodiment of FIGS. 13-17, shoulders 208 include embedded magnets 224 best shown in FIGS. 13 and 14. The magnets 224 are arranged to hold the shroud upwardly against the connecting rods temporarily while the user secures the dust catcher. The dust catcher 200 of FIGS. 13-17 is secured to the connecting rods on the side away from the arbor pulley 106 by clamping arms 211 and threaded fasteners best shown in FIGS. 13 and 15. The clamping arms pivot around the threaded fasteners and are secured over the connecting rod 57 and tightened to secure the dust catcher to the connecting rod. The opposite side of the dust catcher of FIGS. 13-17 is shown in FIG. 14. The side of the dust catcher shown in FIG. 14 includes a vertical slot 226 through which a further threaded fastener is connected to a block 209. The block 209 and the fastener extending through the slot 226 allows the block 209 to be adjustably secured over the connecting rod 57 on the side of the dust catcher adjacent the arbor pulley 106.

The shoulders 208 project outwardly from both sides of the shroud 204 as shown in FIGS. 13-15. This outward projection accommodates variation in the distance between connecting rods 57. Clamping arms 211, block 209, and spring-biased clips 212 are representative retainers for securing the dust catcher to the connecting rods 57 of the pivoting assembly of a table saw and are not intended as an exhaustive representation. Other retainer configurations for securing the dust catcher to the pivoting assembly of a table saw will occur to those of skill in the art and are intended to be encompassed by the claims of the present application.

FIG. 15 illustrates the end of the shroud 204 adjacent the front trunnion 59. This end of the shroud must accommodate penetration of the blade and therefore includes a slot 228 for that purpose. Slot 228 could be molded into the front wall of the shroud or cut by the user by lowering the blade in both a downward and forward direction with the motor running. This end of the shroud also includes opening 230 to accommodate a shaft for hand wheel 75 used to raise and lower the arbor bracket and blade. The side of the shroud 204 shown in FIG. 14 is cut away to accommodate raising and lowering of the arbor bracket, arbor shaft and blade.

The dust catcher 200 of FIGS. 13-17 cooperates with a front plate 220 similar in configuration and function to the front plate 220 described with reference to FIGS. 8-12. The front plate 220 is configured to be closely received in the front trunnion 59. The front trunnion 59 in turn is configured to accommodate rotation of the blade in its lowered position by including a concave area. Aspects of the invention relate to a front plate 220 molded to fit closely in the concave blade recess of the front trunnion 59. It will be understood that the front trunnion and its blade recess may be differently configured for different contractor's table saws. In such a case the front plate 220 may be custom molded for each brand of contractor's table saw. A custom front plate may cooperate with a universal shroud to provide a customized fit for several brands of contractor's table saw. Alternatively, molded shrouds with integral front plates may be provided for each brand of contractor's table saw. One or two piece dust catchers as described are intended to be encompassed by the claims of the present application.

The dust catcher of FIGS. 13-17 is a prototype and is not intended to illustrate finished dimensions or configurations. An opening 232 is schematically shown on FIG. 16. The opening 232 would be covered with a nozzle for connecting the dust catcher to a dust collection system.

While preferred embodiments have been set forth for purposes of illustrations, the foregoing description should not be deemed a limitation of the invention herein. Accordingly, various modifications, adaptations and alternatives may occur to one skilled in the art without departing from the spirit and the scope of the present invention.

The invention claimed is:

1. In combination, a dust catcher and a contractor's table saw, said contractor's table saw comprising:
    a table and beneath the table a pivoting assembly including front and rear trunnions secured to each other by a pair of connecting rods and an arbor bracket arranged to pivot on said front trunnion, said arbor bracket supporting an arbor shaft and a saw blade for rotation on said shaft, the blade being positioned between said connecting rods and parallel thereto, said arbor bracket pivots in a plane parallel to said connecting rods and perpendicular to said front trunnion to raise and lower the arbor shaft and saw blade relative to the table and the front trunnion of the table saw includes a concave configuration to accommodate the saw blade when the arbor bracket is pivoted to lower the saw blade relative to the table,
    said dust catcher comprising:
    a shroud securable to said pivoting assembly for movement therewith, said shroud comprising side walls parallel to said connecting rods and end walls perpendicular to said connecting rods, said side walls and end walls defining an elongated dust collection space between the connecting rods and substantially surrounding the saw blade beneath the table, said front end wall comprising a front plate configured for reception into the concave front trunnion and substantially close a portion of said front end wall adjacent the front trunnion, said front plate including a slot which receives a portion of the saw blade when in a lowered position; and
    a dust collection nozzle extending from a lower portion of said shroud.

2. The combination dust catcher and contractor's table saw of claim 1, wherein said side walls include an arbor side wall and a front end wall meeting to form a corner of said shroud adjacent said front trunnion, said arbor side wall and front end wall including an open portion configured to accommodate movement of the arbor bracket, arbor and blade relative to the shroud.

3. The combination dust catcher and contractor's table saw of claim 1, wherein each said side wall having an outside surface and each said side wall includes at least one shoulder laterally extending from said outside surface to engage an adjacent connecting rod.

4. The combination dust catcher and contractor's table saw of claim 1, wherein said front plate is a separate component from said shroud.

5. The combination dust catcher and contractor's table saw of claim 1, wherein said front plate is integral to said shroud.

6. A dust catcher and table saw in combination,
said table saw having a fixed table and a saw blade assembly supported beneath the table for vertical and angular adjustment of a circular saw blade relative to the fixed table, said saw blade assembly including front and rear trunnions coupled by connecting rods parallel to said saw blade and an arbor bracket supporting an arbor shaft on which the saw blade is mounted for rotation, said arbor bracket pivotably supported on said front trunnion, said saw blade assembly being rotatable about a longitudinal axis parallel to said connecting rods to facilitate angular adjustment of said saw blade with respect to said fixed table,
said dust catcher comprising:
a shroud defining a dust collection space between said connecting rods and substantially surrounding the saw blade beneath said fixed table, said shroud attached to said saw blade assembly for rotation therewith and defining an open portion adjacent said front trunnion configured to accommodate vertical adjustment of said arbor bracket and saw blade between a raised and a lowered position with respect to the fixed table and including a dust collection nozzle extending from a lower portion of said shroud, and a front plate including a slot configured to receive a portion of the saw blade when the saw blade is in the lowered position, said front plate being a separate component configured to at least partially close said open portion.

7. The dust catcher and table saw combination of claim 6, wherein said shroud includes lateral projections and retainers arranged to releasably secure the shroud to the saw blade assembly.

8. The dust catcher and table saw combination of claim 7, wherein an end of said shroud is configured to surround a lower portion of the saw blade in the lowered position.

9. A dust catcher in combination with a table saw having a table and beneath the table a pivoting assembly including front and rear trunnions secured to each other by a pair of connecting rods and an arbor bracket supporting an arbor shaft and a saw blade for rotation on said shaft, the saw blade being positioned between said connecting rods and said arbor bracket being movable relative to said front trunnion to raise and lower said arbor and blade relative to said table, said front trunnion including a concave configuration to accommodate a portion of the saw blade when the arbor bracket is pivoted to lower the saw blade relative to the table,
said dust catcher comprising:
a shroud defining a dust collection space between the connecting rods and front and rear trunnions, said shroud substantially surrounding the saw blade beneath the table, said shroud having a front end adjacent said front trunnion, said front end configured to accommodate the saw blade in a lowered position and lateral projections and retainers to releasably secure the shroud to the pivoting assembly for movement therewith, said front end including a separate front plate configured for reception into the concave front trunnion and securable to said shroud to cover an opening in the front end of said shroud, said front plate including a slot configured to receive a portion of the saw blade when in a lowered position.

* * * * *